(12) United States Patent
Sasaki et al.

(10) Patent No.: US 11,802,535 B2
(45) Date of Patent: Oct. 31, 2023

(54) SMALL HYDROELECTRIC POWER GENERATION APPARATUS

(71) Applicant: ELIS CO., LTD., Okayama (JP)

(72) Inventors: Soichi Sasaki, Nagasaki (JP); Jun Kuwahara, Okayama (JP)

(73) Assignee: ELIS CO., LTD., Okayama (JP)

( * ) Notice: Subject to any disclaimer, the term of this patent is extended or adjusted under 35 U.S.C. 154(b) by 0 days.

(21) Appl. No.: 17/436,849

(22) PCT Filed: Dec. 1, 2020

(86) PCT No.: PCT/JP2020/044732
§ 371 (c)(1),
(2) Date: Sep. 7, 2021

(87) PCT Pub. No.: WO2021/260967
PCT Pub. Date: Dec. 30, 2021

(65) Prior Publication Data
US 2023/0123803 A1    Apr. 20, 2023

(30) Foreign Application Priority Data
Jun. 25, 2020   (JP) .................. 2020-109891

(51) Int. Cl.
*F03B 7/00*    (2006.01)
(52) U.S. Cl.
CPC ...................................... *F03B 7/00* (2013.01)
(58) Field of Classification Search
CPC .. F03B 7/00; F03B 7/003; F03B 7/006; F03B 11/00; F03B 15/00; F03B 15/04; F03B 15/06; F05B 2240/13; F05B 2240/915
See application file for complete search history.

(56) References Cited

U.S. PATENT DOCUMENTS

| | | | |
|---|---|---|---|
| 4,973,856 A | 11/1990 | Loreto et al. | |
| 5,430,332 A | * 7/1995 | Dunn, Jr. | ............. F03B 17/063 290/43 |
| 6,208,037 B1 | 3/2001 | Mayo, Jr. et al. | |

(Continued)

FOREIGN PATENT DOCUMENTS

| CN | 109563800 A | 4/2019 |
|---|---|---|
| DE | 10-2007-022860 A1 | 6/2008 |

(Continued)

OTHER PUBLICATIONS

International Search Report dated Dec. 28, 2020 issued in Patent Application No. PCT/JP2020/044732.

*Primary Examiner* — Woody A Lee, Jr.
*Assistant Examiner* — Eric A Lange
(74) *Attorney, Agent, or Firm* — Pearne & Gordon LLP

(57) ABSTRACT

Power can be efficiently generated in accordance with the amount of water in a channel by including: a first headrace channel positioned on an upstream side; a second headrace channel positioned on a downstream side; a water wheel on a most downstream side of the first headrace channel and the second headrace channel, the water wheel having a rotation shaft in a direction orthogonally intersecting with a water flow; a lateral movement apparatus that enables the second headrace channel to be moved in an upstream direction or a downstream direction; and a vertical movement apparatus that enables the water wheel to be moved in a vertical direction.

6 Claims, 8 Drawing Sheets

(56) References Cited

U.S. PATENT DOCUMENTS

2007/0182159 A1    8/2007   Davis
2011/0299988 A1   12/2011   Riegerbauer

FOREIGN PATENT DOCUMENTS

| DE | 10 2014 110 877 A1 | | 2/2016 | |
|----|------|---|--------|---|
| JP | 2004-068655 A | | 3/2004 | |
| JP | 2004068655 A | * | 3/2004 | |
| JP | 2008-169734 A | | 7/2008 | |
| JP | 2009174480 A | * | 8/2009 | |
| JP | 2015-031229 A | | 2/2015 | |
| JP | 2015031229 A | * | 2/2015 | |
| JP | 6168902 B2 | | 7/2017 | |
| JP | 6282236 B2 | * | 2/2018 | |
| JP | 6282236 B2 | | 2/2018 | |
| KR | 102040831 B1 | * | 11/2019 | ............... B66F 1/06 |
| WO | WO-2010000957 A2 | * | 1/2010 | ............ F03B 17/063 |

* cited by examiner

SMALL HYDROELECTRIC POWER GENERATION APPARATUS

TECHNICAL FIELD

The present disclosure relates to a small hydroelectric power generation apparatus.

BACKGROUND

Hitherto, in an irrigation channel and the like provided in the countryside, small hydroelectric power generation using the water flow in the channel has been widely performed. However, the amount of water flowing in the channel in which the small hydroelectric power generation apparatus is installed greatly increases or decreases in accordance with periods such as a non-irrigation period, an irrigation period, and a puddling period and places, and hence it has been difficult to maintain an optimal power generation efficiency. Thus, small hydroelectric power generation apparatuses that can respond to the increase and decrease of the amount of water in the channel are proposed.

As a related art relating to the small hydroelectric power generation apparatuses as above, in Patent Literature 1, a configuration including a water wheel (turbine apparatus), a lifting and lowering apparatus, and a flow quantity adjustment apparatus is proposed, and power can be efficiently generated in accordance with the water level by adjusting the water level by the flow quantity adjustment apparatus and vertically moving the water wheel. In Patent Literature 2, a configuration including a water wheel (turbine apparatus) and a water level adjustment gate is proposed, and the angle by which the water flow hits the water wheel is adjusted by rotationally controlling the water level adjustment gate.

CITATION LIST

Patent Literature

Patent Literature 1: Japanese Patent No. 6168902
Patent Literature 2: Japanese Patent No. 6282236

SUMMARY

It is known that the flow velocity is low near the bottom surface and the flow velocity is high near the water surface in an open channel. Therefore, in order to perform efficient small hydroelectric power generation in the open channel, it is important to use the water flow near the water surface. However, a small hydroelectric power generation apparatus in Patent Literature 1 does not use the water flow near the water surface and the flow velocity of the water guided by the water wheel is reduced by the flow quantity adjustment apparatus. Therefore, it is hard to say that the small hydroelectric power generation apparatus in Patent Literature 1 effectively uses the flow velocity in the channel. Although a small hydroelectric power generation apparatus in Patent Literature 2 uses the water flow near the water surface having high flow velocity, the flow velocity of the water guided by the water wheel is reduced by the water level adjustment gate. Therefore, it is hard to say that the flow velocity in the channel is effectively used also for Patent Literature 2.

The small hydroelectric power generation apparatuses in Patent Literature 1 and Patent Literature 2 can change the angle of the water flow guided by the water wheel by adjusting the positions of the water wheel and the flow quantity adjustment apparatus or the water level adjustment gate. However, Patent Literature 1 and Patent Literature 2 cannot adjust the positional relationship between the water flow guided by the water wheel and the water wheel in the horizontal direction, and hence there is a fear that the water flow may hit a place near the center of the water wheel and the flow velocity cannot be effectively used. The small hydroelectric power generation apparatuses in Patent Literature 1 and Patent Literature 2 use the entire flow quantity of the water flow in the channel, and it is difficult to emit rubbish and secure a fishway, for example, at the time of operation.

A small hydroelectric power generation apparatus according to the present disclosure has been made in order to solve the abovementioned problems, and enables efficient power generation in accordance with the amount of water in a channel without reducing the flow velocity of water guided by a water wheel by using the water flow near the water surface of which flow velocity is high and adjusting the angle by which the water flow hits the water wheel.

A small hydroelectric power generation apparatus according to the present disclosure includes: a first headrace channel positioned on an upstream side; a second headrace channel positioned on a downstream side; a water wheel on a most downstream side of the first headrace channel and the second headrace channel, the water wheel having a rotation shaft in a direction orthogonally intersecting with a water flow; a lateral movement apparatus that enables the second headrace channel to be moved in an upstream direction or a downstream direction; and a vertical movement apparatus that enables the water wheel to be moved in a vertical direction. In the small hydroelectric power generation apparatus, the second headrace channel discharges the water flow to the water wheel, and the lateral movement apparatus enables the second headrace channel and the water wheel to be separated from each other or approach each other in a horizontal direction by moving the second headrace channel.

In the small hydroelectric power generation apparatus according to the present disclosure, it is preferable that the second headrace channel, the water wheel, the lateral movement apparatus, and the vertical movement apparatus be integrally formed, and a base portion of the second headrace channel, the water wheel, the lateral movement apparatus, and the vertical movement apparatus that are integrally formed be installable on a ground surface.

The small hydroelectric power generation apparatus according to the present disclosure is able to move each of the second headrace channel and the water wheel by the lateral movement apparatus and the vertical movement apparatus, and hence is able to perform efficient power generation in accordance with the amount of water in the channel without reducing the flow velocity of the water guided by the water wheel by using the water flow near the water surface of which flow velocity is high and adjusting the angle by which the water flow hits the water wheel.

DETAILED DESCRIPTION OF THE EMBODIMENTS

An embodiment of the present disclosure is described with reference to the drawings. A small hydroelectric power generation apparatus according to the present disclosure is described below by taking the structure of the small hydroelectric power generation apparatus and the states of the small hydroelectric power generation apparatus as examples.

1. Structure of Small Hydroelectric Power Generation Apparatus

Figure 1:
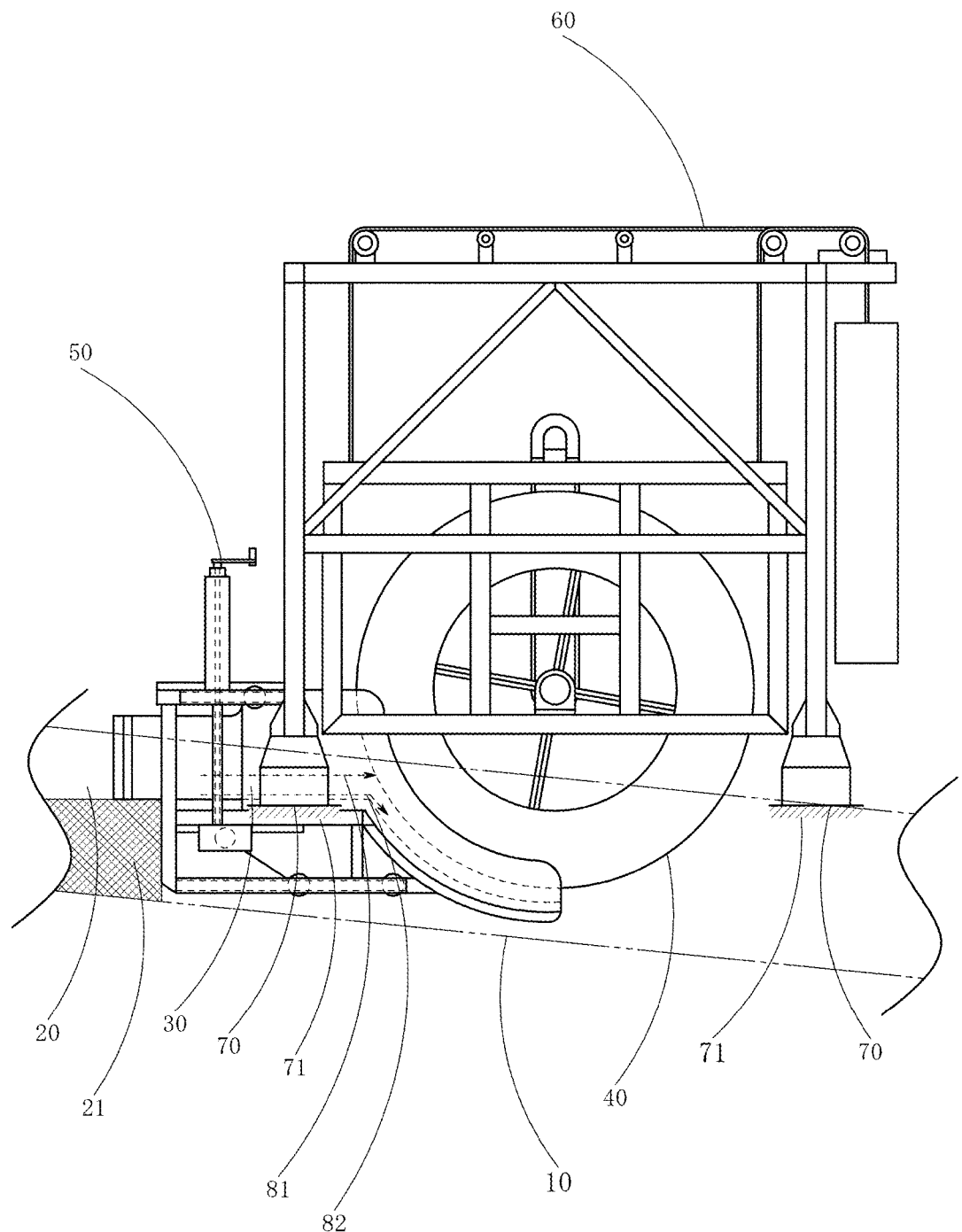
FIG. 1 is a side view illustrating one example of a small hydroelectric power generation apparatus according to the present disclosure.
Figure 2:
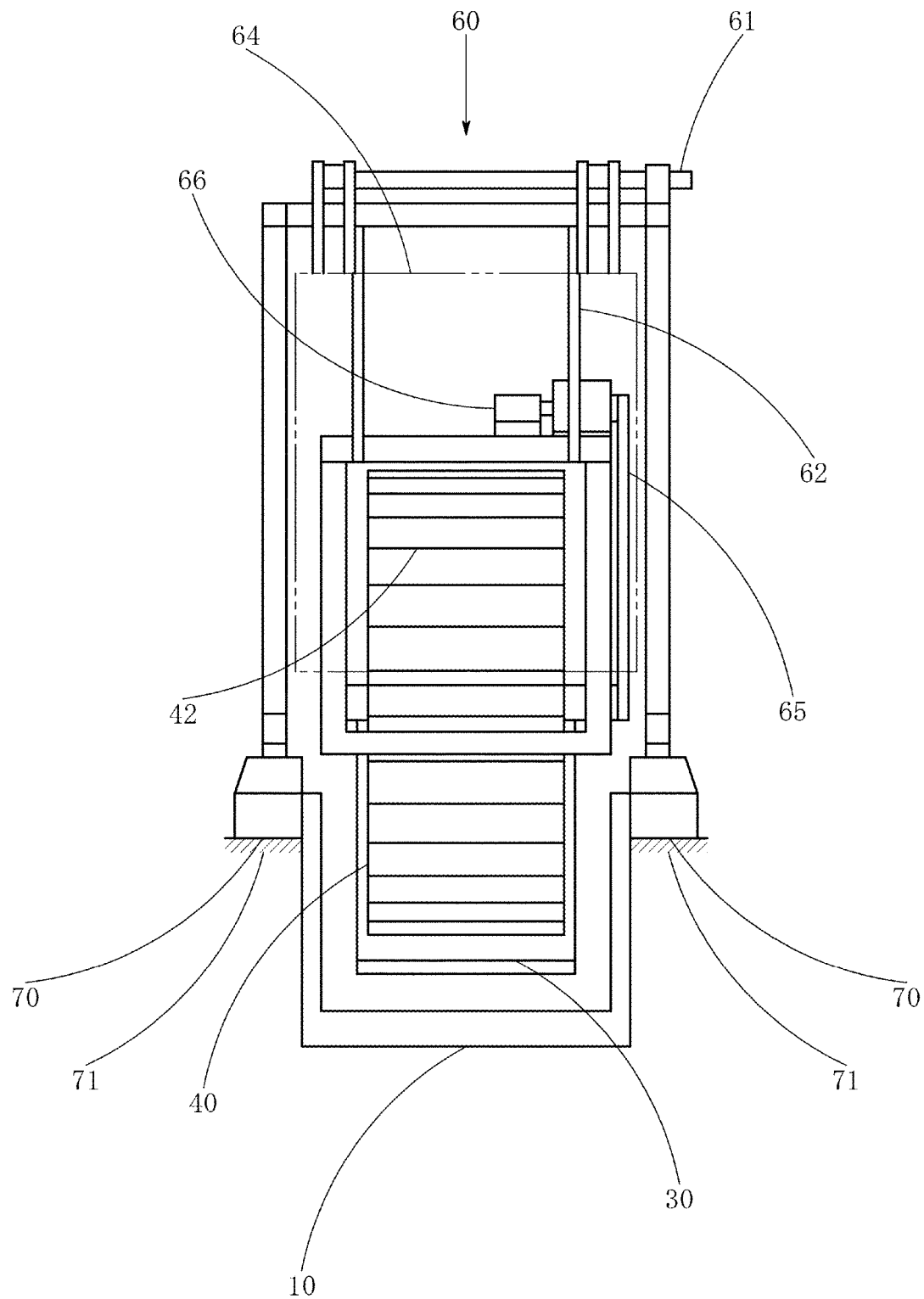
FIG. 2 is a front view illustrating the small hydroelectric power generation apparatus of the present example.
Figure 3:
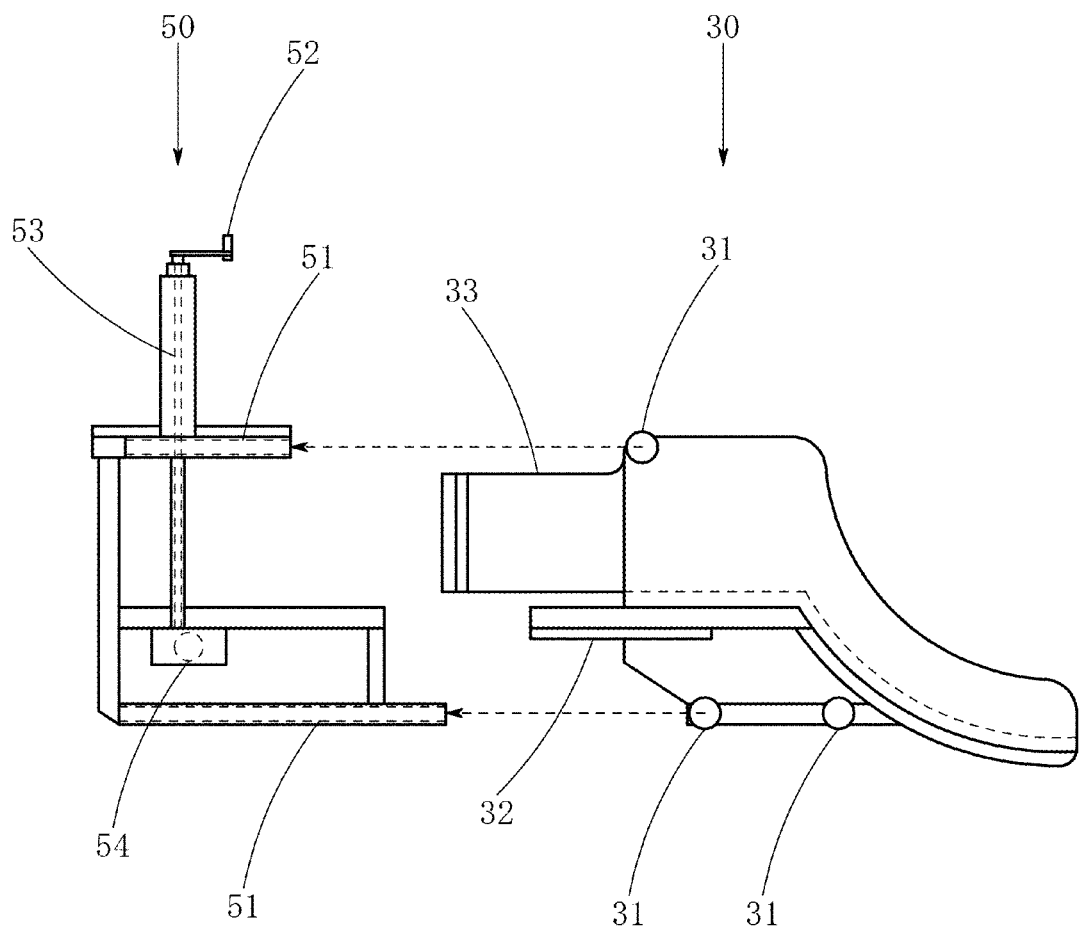
FIG. 3 is a side view illustrating a second headrace channel and a lateral movement apparatus in the small hydroelectric power generation apparatus of the present example.
Figure 4:
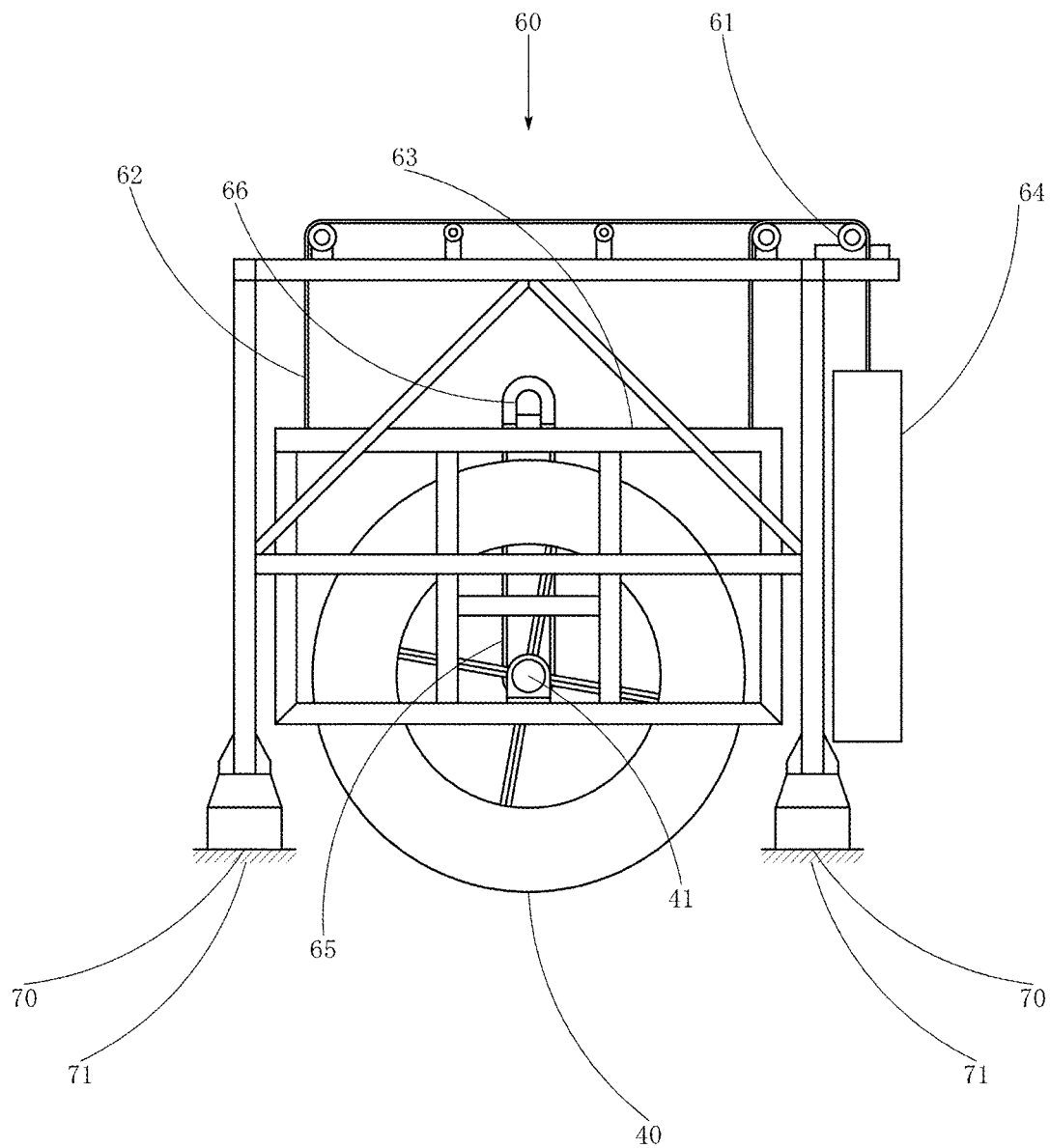
FIG. 4 is a side view illustrating a water wheel and a vertical movement apparatus in the small hydroelectric power generation apparatus of the present example.

The structure of the small hydroelectric power generation apparatus according to the present disclosure is described. FIG. 1 is a side view illustrating one example of the small hydroelectric power generation apparatus according to the present disclosure. FIG. 2 is a front view illustrating the small hydroelectric power generation apparatus of the present example. FIG. 3 is a side view illustrating a second headrace channel and a lateral movement apparatus in the small hydroelectric power generation apparatus of the present example. FIG. 4 is a side view illustrating a water wheel and a vertical movement apparatus in the small hydroelectric power generation apparatus of the present example.

As illustrated in FIG. 1, the small hydroelectric power generation apparatus of the present example includes: a first headrace channel 20 positioned on an upstream side; a second headrace channel 30 positioned on a downstream side; a water wheel 40 on a most downstream side of the first headrace channel 20 and the second headrace channel 30 that are continuous, the water wheel 40 having a rotation shaft in a direction orthogonally intersecting with a water flow; a lateral movement apparatus 50 that enables the second headrace channel 30 to be moved in an upstream direction or a downstream direction; and a vertical movement apparatus 60 that enables the water wheel 40 to be moved in a vertical direction. In the small hydroelectric power generation apparatus, the first headrace channel 20 guides the water flow to the second headrace channel 30, and the second headrace channel 30 guides the water flow to the water wheel 40.

When structures such as a weir and a gate are provided in a channel, the water flow in the channel is inhibited by those structures. However, in the small hydroelectric power generation apparatus of the present example, those structures are not provided in the first headrace channel 20 and the second headrace channel 30. As a result, the water flow can be guided to the water wheel 40 without reducing the flow velocity in the first headrace channel 20 and the second headrace channel 30. The water flow guided to the water wheel 40 from the first headrace channel 20 and the second headrace channel 30 and used for power generation is a water flow 81 near the water surface of which flow velocity is high, and hence efficient power generation using the flow velocity can be performed.

In the small hydroelectric power generation apparatus of the present example, the water flow 81 near the water surface of the second headrace channel 30 hits the water wheel 40 and is used for power generation after being discharged from the second headrace channel 30, but the water flow 82 near the bottom surface does not hit the water wheel 40 and flows below the water wheel after being discharged from the second headrace channel 30. As above, the small hydroelectric power generation apparatus of the present example uses a part of the flow quantity in the channel and does not use the entire flow quantity. Therefore, rubbish can be emitted and a fishway can be secured, for example, also at the time of operation of the small hydroelectric power generation apparatus. In the small hydroelectric power generation apparatus of the present example, the water flow 82 near the bottom surface of the second headrace channel 30 is not used for power generation. However, in the small hydroelectric power generation apparatus according to the present disclosure, the water flow near the bottom surface may be used for power generation or the entire flow quantity in the channel may be used for power generation in accordance with the installed state, the power generation environment, and the like.

As illustrated in FIG. 1 and FIG. 2, in the small hydroelectric power generation apparatus of the present example, the second headrace channel 30 and the lateral movement apparatus 50 are fixed at a wheel 31 and a rail 51 described below and a rack 32 and a pinion 54 described below, and the water wheel 40 and the vertical movement apparatus 60 are fixed at a central portion 41 of the water wheel 40 and a lifting and lowering portion 63 described below. The lateral movement apparatus 50 and the vertical movement apparatus 60 have structures joined by a support member at a frame having the rail 51 of the lateral movement apparatus 50 and at a support post of the vertical movement apparatus 60. As above, the second headrace channel 30, the water wheel 40, the lateral movement apparatus 50, and the vertical movement apparatus 60 are integrally formed, and a base portion 70 of the second headrace channel 30, the water wheel 40, the lateral movement apparatus 50, and the vertical movement apparatus 60 that are integrally formed is installed on a ground surface 71.

The base portion 70 is installed on the ground surface 71 outside a channel 10, and hence the small hydroelectric power generation apparatus according to the present disclosure is easily installed in the channel even when it is difficult to perform construction work on the inside of the channel. Costs for introducing the small hydroelectric power generation apparatus can be reduced by applying the present disclosure.

In the small hydroelectric power generation apparatus of the present example, the first headrace channel 20 is formed by providing a bottom portion 21 on the bottom surface of the headrace channel 10, and the second headrace channel 30 is provided in the headrace channel 10. However, in the small hydroelectric power generation apparatus according to the present disclosure, the first headrace channel 20 and the second headrace channel 30 are not limited to the configuration of the present example, and the first headrace channel 20 may be provided so as to be separated from the headrace channel 10 and the second headrace channel 30 does not necessarily need to be provided in the headrace channel 10.

As illustrated in FIG. 3, in the small hydroelectric power generation apparatus of the present example, the second headrace channel 30 includes the wheel 31, the rack 32, and a connection portion 33, and the lateral movement apparatus 50 includes the rail 51, a handle 52, an axial rod 53, and the pinion 54.

The wheel 31 is installed so as to be rollable on the rail 51, and the rack 32 and the pinion 54 are engaged with each other. As a result, the second headrace channel 30 and the lateral movement apparatus 50 are fixed. By rotating the handle 52, the rotational force is transmitted to the pinion 54 by the axial rod 53, and the pinion 54 and the rack 32 function as a rack and pinion mechanism. As a result, the lateral movement apparatus 50 can move the second headrace channel 30 in the upstream direction or the downstream direction. It becomes easy for the second headrace channel 30 to guide the water flow from the first headrace channel 20 to the second headrace channel 30 by disposing the connection portion 33 in the first headrace channel 20.

In the small hydroelectric power generation apparatus of the present example, the lateral movement apparatus 50 enables the second headrace channel 30 to be moved in the upstream direction or the downstream direction by the rack and pinion mechanism. However, in the small hydroelectric power generation apparatus according to the present disclosure, the lateral movement apparatus 50 is not limited to the configuration of the present example. The lateral movement apparatus 50 may enable the second headrace channel 30 to be moved in the upstream direction or the downstream direction by a crank mechanism and the like that convert the rotational motion of the handle 52 to a reciprocating motion of the second headrace channel 30, for example.

As illustrated in FIG. 2 and FIG. 4, in the small hydroelectric power generation apparatus of the present example, the water wheel 40 includes the central portion 41 and blades 42, and the vertical movement apparatus 60 includes a motor 61, a hanging portion 62, the lifting and lowering portion 63, a weight 64, a chain 65, and a power generator 66.

The water wheel 40 and the vertical movement apparatus 60 are fixed at the central portion 41 formed by the rotation shaft and a bearing and the lifting and lowering portion 63. The lifting and lowering portion 63 hung by the hanging portion 62 can be moved in the vertical direction by rotating the motor 61. As a result, the vertical movement apparatus 60 can move the water wheel 40 in the vertical direction. The vertical movement apparatus 60 includes the weight 64, and hence the hanging portion 62 can stably hang the lifting and lowering portion 63 and the water wheel 40. The water flow hits the blades 42, to thereby cause the water wheel 40 to rotate. The rotational force of the water wheel 40 is transmitted to the power generator 66 by the chain 65. As a result, the small hydroelectric power generation apparatus of the present example can generate power.

The lateral movement apparatus 50 and the vertical movement apparatus 60 are individually actuated in the small hydroelectric power generation apparatus of the present example. However, in the small hydroelectric power generation apparatus according to the present disclosure, the lateral movement apparatus 50 and the vertical movement apparatus 60 may operate together, or the second headrace channel 30 and the water wheel 40 may be moved by automatically actuating the lateral movement apparatus 50 and the vertical movement apparatus 60 in accordance with the amount of water and the flow velocity in the channel.

2. States of Small Hydroelectric Power Generation Apparatus

Figure 5:
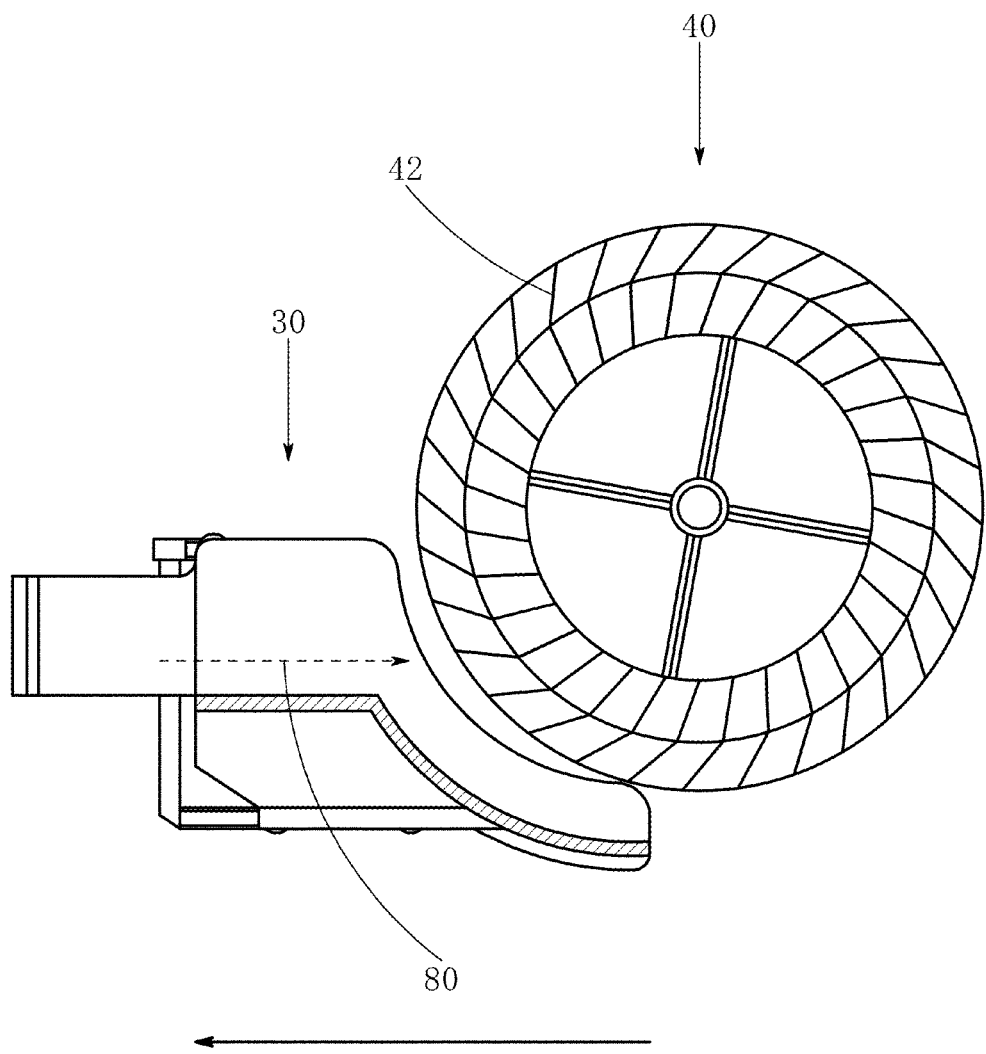
FIG. 5 is a schematic cross-sectional view illustrating a state in which the second headrace channel in the small hydroelectric power generation apparatus of the present example is moved in the upstream direction.
Figure 6:
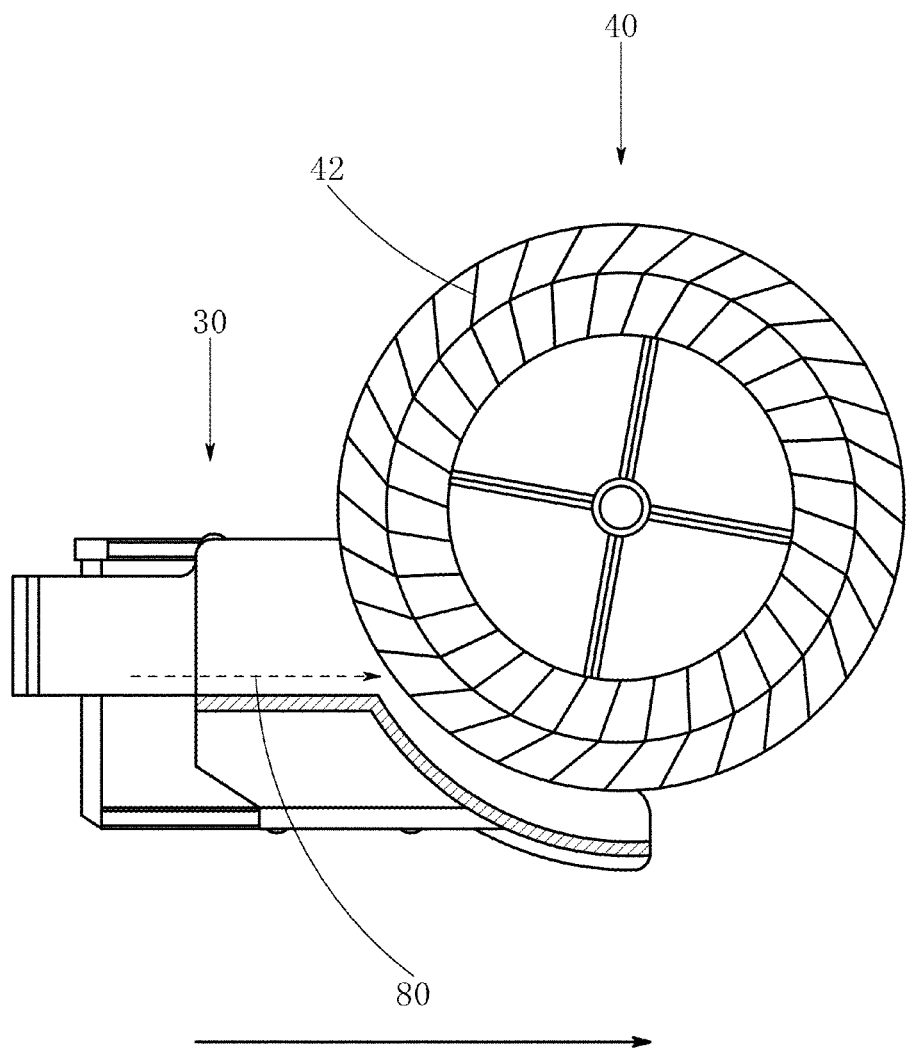
FIG. 6 is a schematic cross-sectional view illustrating a state in which the second headrace channel in the small hydroelectric power generation apparatus of the present example is moved in the downstream direction.
Figure 7:
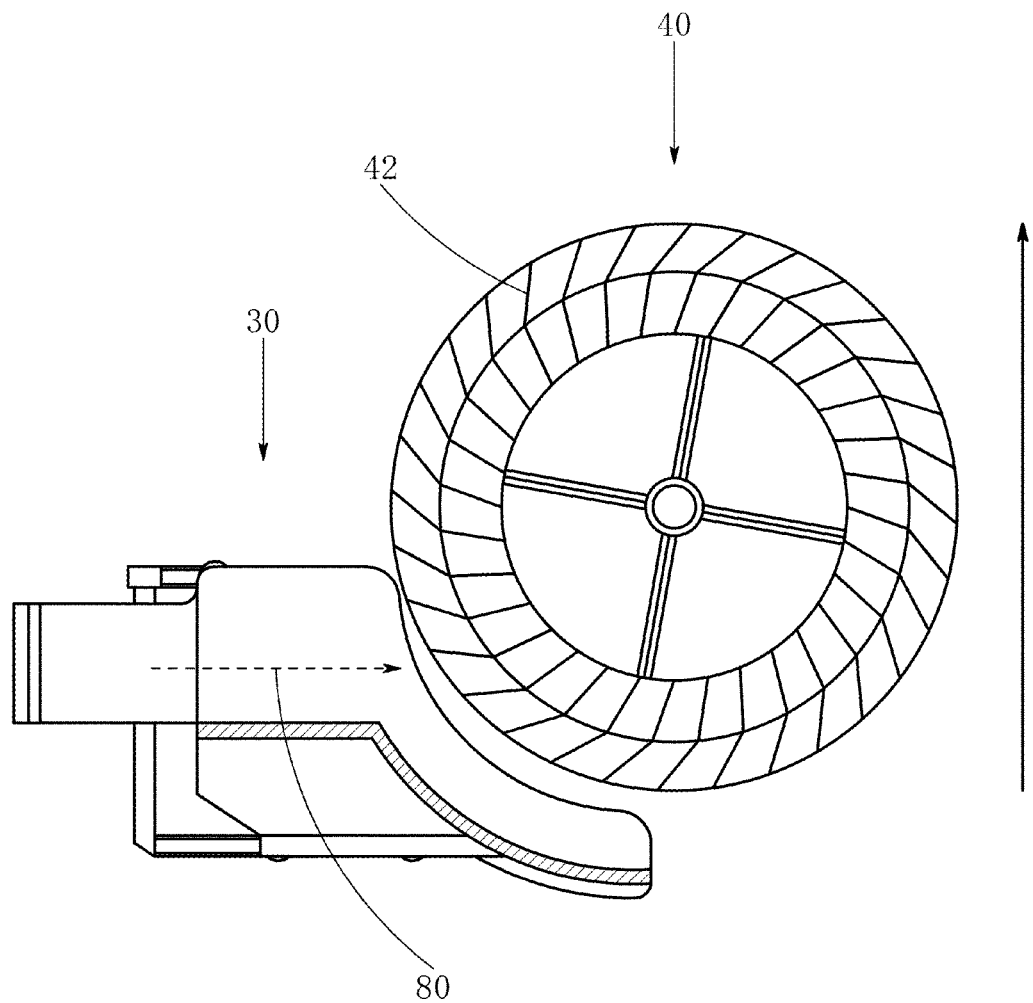
FIG. 7 is a schematic cross-sectional view illustrating a state in which the water wheel in the small hydroelectric power generation apparatus of the present example is moved in the upper direction.
Figure 8:
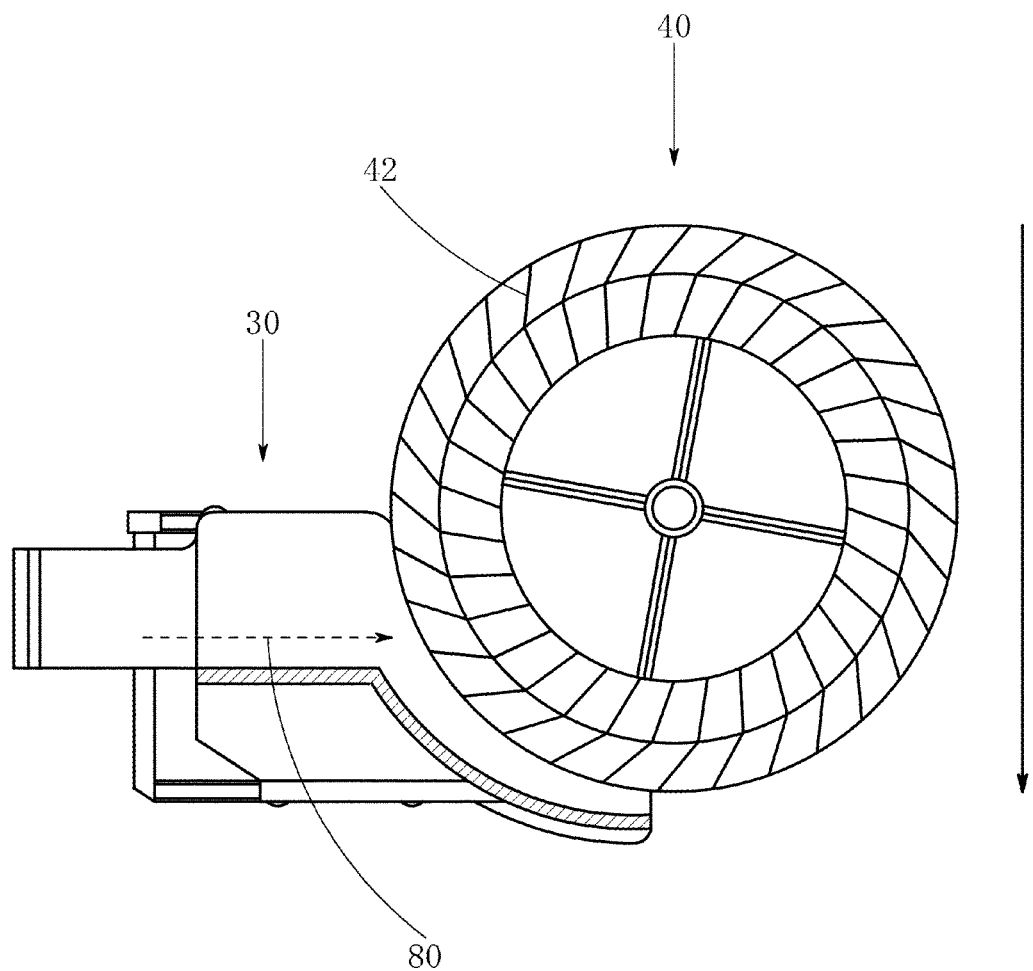
FIG. 8 is a schematic cross-sectional view illustrating a state in which the water wheel in the small hydroelectric power generation apparatus of the present example is moved in the lower direction.

States of the small hydroelectric power generation apparatus according to the present disclosure are described. FIG. 5 is a schematic cross-sectional view illustrating a state in which the second headrace channel in the small hydroelectric power generation apparatus of the present example is moved in the upstream direction. FIG. 6 is a schematic cross-sectional view illustrating a state in which the second headrace channel in the small hydroelectric power generation apparatus of the present example is moved in the downstream direction. FIG. 7 is a schematic cross-sectional view illustrating a state in which the water wheel in the small hydroelectric power generation apparatus of the present example is moved in the upper direction. FIG. 8 is a schematic cross-sectional view illustrating a state in which the water wheel in the small hydroelectric power generation apparatus of the present example is moved in the lower direction.

As illustrated in FIG. 5 and FIG. 6, in the small hydroelectric power generation apparatus of the present example, the second headrace channel 30 can move in the upstream direction or the downstream direction by the lateral movement apparatus 50. The second headrace channel 30 and the water wheel 40 can be separated from each other in the horizontal direction by moving (raising) the second headrace channel 30 in the upstream direction. Therefore, even when the amount of water flowing in the channel increases, the angle by which the water flow 80 hits the blades 42 of the water wheel 40 can be adjusted, and the power generation efficiency can be improved. The second headrace channel 30 and the water wheel 40 can be caused to approach each other in the horizontal direction by moving (lowering) the second headrace channel 30 in the downstream direction. Therefore, even when the amount of water flowing in the channel decreases, the angle by which the water flow 80 hits the blades 42 of the water wheel 40 can be adjusted, and the power generation efficiency can be improved.

In the small hydroelectric power generation apparatus, when the water flow hits a place near the center of the water wheel, the rotational force decreases and the power generation efficiency decreases. In the small hydroelectric power generation apparatus of the present example, by moving the second headrace channel 30 in the upstream direction or the downstream direction, not only can the angle by which the water flow 80 hits the blades 42 of the water wheel 40 be adjusted, but also the positional relationship between the water flow 80 and the water wheel 40 in the horizontal direction can be adjusted. Therefore, power generation effectively using the flow velocity becomes possible without hitting the water flow 80 to a place near the central portion 41 of the water wheel 40.

As illustrated in FIG. 7 and FIG. 8, in the small hydroelectric power generation apparatus of the present example, the water wheel 40 can move in the vertical direction by the vertical movement apparatus 60. The second headrace channel 30 and the water wheel 40 can be separated from each other in the vertical direction by moving (raising) the water wheel 40 in the upper direction. Therefore, even when the amount of water flowing in the channel increases, the angle by which the water flow 80 hits the blades 42 of the water wheel 40 can be adjusted, and the power generation efficiency can be improved. The second headrace channel 30 and the water wheel 40 can be caused to approach each other in the vertical direction by moving (lowering) the water wheel 40 in the lower direction. Therefore, even when the amount of water flowing in the channel decreases, the angle by which the water flow 80 hits the blades 42 of the water wheel 40 can be adjusted, and the power generation efficiency can be improved.

When the amount of water flowing in the channel increases and the water level in the channel rises, there is a fear that the blades 42 of the water wheel 40 may come into contact with the water surface and the power generation efficiency may decrease. In such cases, power can be generated without bringing the blades 42 into contact with the water surface by moving the water wheel 40 in the upper direction by the vertical movement apparatus 60.

States in which only one of the second headrace channel 30 and the water wheel 40 is moved are illustrated in FIG. 5 to FIG. 8, but the power generation efficiency can be improved more by obtaining an optimal positional relationship in accordance with the amount of water and the flow velocity in the channel by moving both of the second headrace channel 30 and the water wheel 40 in the small hydroelectric power generation apparatus of the present example. Regarding the positional relationship in the horizontal direction, high power generation efficiency can be obtained when the distance between the second headrace channel 30 and the water wheel 40 is set to be the same degree as the water level in the second headrace channel by the lateral movement apparatus 50.

In general, when the small hydroelectric power generation apparatus is introduced in a channel such as an irrigation channel, a water wheel with a strength in accordance with the maximum flow quantity in the channel needs to be designed. Meanwhile, in the small hydroelectric power generation apparatus of the present example, the second headrace channel 30 and the water wheel 40 can be moved in accordance with the increase and decrease of the amount of water in the channel, and the flow quantity that hits the water wheel 40 can be adjusted by moving the second headrace channel 30 to the upstream side or moving the water wheel 40 in the upper direction in periods or places with a large amount of water. As a result, in the small hydroelectric power generation apparatus of the present example, a water wheel in accordance with the maximum flow quantity in the channel does not necessarily need to be individually designed, and the small hydroelectric power generation apparatus can be introduced into channels in various environments in a versatile manner.

REFERENCE SIGNS LIST

10 Headrace channel
20 First headrace channel
21 Bottom portion
30 Second headrace channel
31 Wheel
32 Rack
33 Connection portion
40 Water wheel
41 Central portion
42 Blade
50 Lateral movement apparatus
51 Rail
52 Handle
53 Axial rod
54 Pinion
60 Vertical movement apparatus
61 Motor
62 Hanging portion
63 Lifting and lowering portion
64 Weight
65 Chain
66 Power generator
70 Base portion
71 Ground surface
80 Water flow
81 Water flow near water surface
82 Water flow near bottom surface

What is claimed is:

1. A small hydroelectric power generation apparatus comprising:
    a first headrace channel positioned on an upstream side;
    a second headrace channel positioned on a downstream side, the second headrace channel including an upstream end portion and a downstream end portion;
    a water wheel on a most downstream side of the first headrace channel and the second headrace channel, the water wheel having a rotation shaft in a direction orthogonally intersecting with a water flow;
    a lateral movement apparatus that enables the second headrace channel to be moved in an upstream direction or a downstream direction; and
    a vertical movement apparatus that enables the water wheel to be moved in a vertical direction, wherein:
    the second headrace channel discharges the water flow to the water wheel;
    the lateral movement apparatus enables the second headrace channel and the water wheel to be separated from each other or approach each other in a horizontal direction by moving an entirety of the second headrace channel including the upstream end portion and the downstream end portion in the horizontal direction;
    the downstream end portion of the second headrace channel is always positioned below the water wheel when the lateral movement apparatus causes the second headrace channel and the water wheel to be separated from each other or approach each other in the horizontal direction; and
    the water wheel always rotates about the rotation shaft in a counterclockwise direction when the lateral movement apparatus causes the second headrace channel and the water wheel to be separated from each other or approach each other in the horizontal direction.

2. The small hydroelectric power generation apparatus according to claim 1, wherein:
    the second headrace channel, the water wheel, the lateral movement apparatus, and the vertical movement apparatus are integrally formed; and
    a base portion of the second headrace channel, the water wheel, the lateral movement apparatus, and the vertical movement apparatus that are integrally formed is installable on a ground surface.

3. The small hydroelectric power generation apparatus according to claim 1, wherein
    the second headrace channel includes a wheel,
    the lateral movement apparatus includes a rail, and
    the entirety of the second headrace channel moves in the horizontal direction by rotating the wheel on the rail.

4. The small hydroelectric power generation apparatus according to claim 1, wherein the second headrace channel includes a rack, the lateral movement apparatus includes a pinion which engages with the rack, and the entirety of the second headrace channel moves in the horizontal direction by rotating the pinion.

5. The small hydroelectric power generation apparatus according to claim 1, wherein the water wheel includes bent plate blades.

6. A small hydroelectric power generation apparatus comprising:

a first headrace channel positioned on an upstream side;

a second headrace channel positioned on a downstream side, the second headrace channel including an upstream end portion and a downstream end portion;

a water wheel on a most downstream side of the first headrace channel and the second headrace channel, the water wheel having a rotation shaft in a direction orthogonally intersecting with a water flow;

a lateral movement apparatus that enables the second headrace channel to be moved in an upstream direction or a downstream direction; and a vertical movement apparatus that enables the water wheel to be moved in a vertical direction, wherein:

the second headrace channel discharges the water flow to the water wheel;

the lateral movement apparatus enables the second headrace channel and the water wheel to be separated from each other or approach each other in a horizontal direction by moving an entirety of the second headrace channel including the upstream end portion and the downstream end portion in the horizontal direction;

the second headrace channel includes a wheel;

the lateral movement apparatus includes a rail; and the entirety of the second headrace channel moves in the horizontal direction by rotating the wheel on the rail.

* * * * *